W. SELLERS.
Lawn-Mowers.

No. 143,787.  Patented Oct. 21, 1873.

Witnesses.
Geo Gray
H. C. Hale

William Sellers.
by his attorney
H. R. Hale

UNITED STATES PATENT OFFICE.

WILLIAM SELLERS, OF HAVERHILL, MASSACHUSETTS.

IMPROVEMENT IN LAWN-MOWERS.

Specification forming part of Letters Patent No. 143,787, dated October 21, 1873; application filed September 24, 1873.

*To all whom it may concern:*

Figure 1:
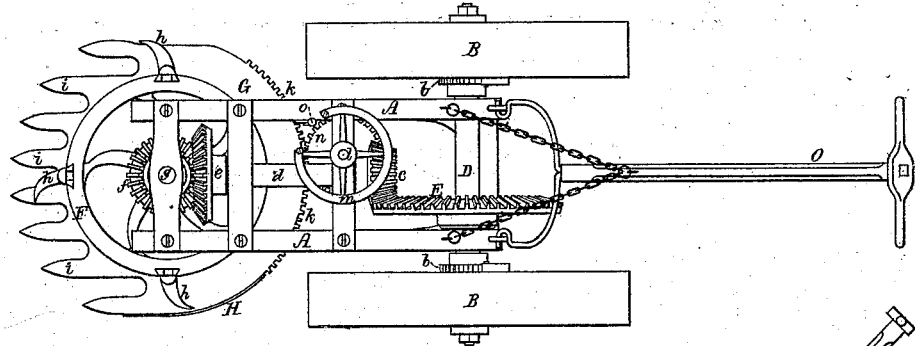
Figure 2:
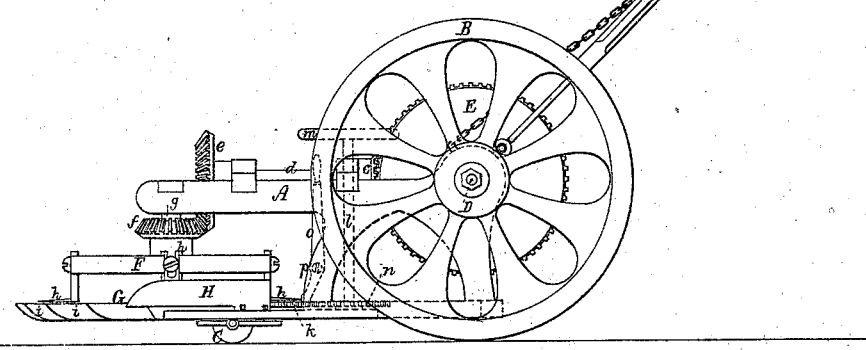
Figure 3:
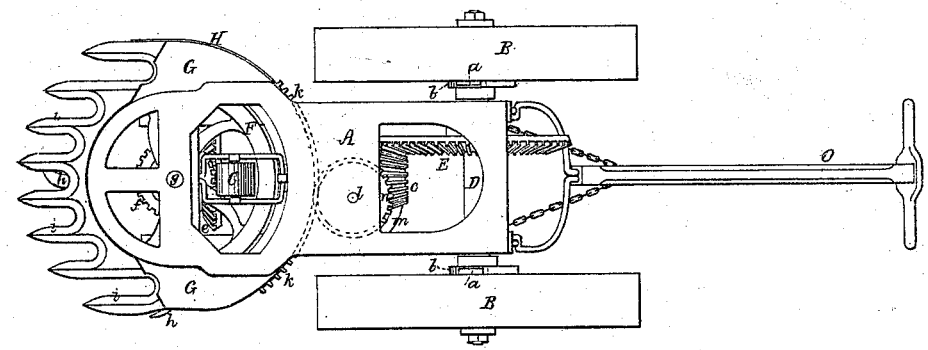

Be it known that I, WILLIAM SELLERS, of Haverhill, in the county of Essex and State of Massachusetts, have invented an Improved Lawn-Mower, of which the following is a specification:

In the accompanying drawing, Figure 1 denotes a top view, Fig. 2 a side elevation, and Fig. 3 a bottom view, of a lawn-mower constructed in accordance with my invention.

The object of my invention is to produce a simple, compact, and effective machine for cutting grass upon lawns, whereby the cutting of ordinary lawns as well as those embellished with trees and shrubbery may be more readily effected than by machines of this character as heretofore constructed, my apparatus being equally adapted for cutting a straight swath or one of any desired curvature, while it does not trample or mash down the grass before being cut, and will also cut grass of any height, which most of the ordinary lawn-mowers will not do.

In the drawing, A A denote the frame for supporting the main operating parts, the same being made of wood or other suitable material, and upheld by two driving-wheels, B B, and a leading-wheel, C, respectively arranged as shown in Figs. 2 and 3. The driving-wheels are affixed to an axle, D, extending through the rear part of the frame A. Each hub of the wheels carries on its inner face an impelling-pawl, $a$, which operates with an annular ratchet, $b$, securely fixed to the axle D, the same being to produce a rotation of the axle when the wheels are moved forward, but causing no rotation thereof when the wheels are turned backward. The axle D carries a large bevel-gear, E, which engages with another bevel-gear, $c$, affixed to the rear end of a horizontal shaft, $d$, supported in bearings in the frame, as shown in Fig. 1. On the front end of the shaft $d$ is a bevel-gear, $e$, which engages with another gear, $f$, affixed to a vertical shaft, $g$, arranged and supported in the frame, as shown in Figs. 1 and 2. The shaft $g$ carries a wheel, F, to whose periphery is attached a series of adjustable curved knives, $h\ h$, &c. G is a curved metallic plate, whose lower surface rests on the front portion of the frame, and turns on the shaft $g$ as a center. The plate G is provided on its front edge with a series of blades or fingers, $i\ i\ i$, &c., with which the curved knives or cutters $h$ operate. The rear part of the plate G has a curved segmental rack, $k$, affixed to it, as shown in Figs. 1, 2, and 3. This rack engages with a pinion, $n$, secured to a vertical shaft, $l$, which is disposed and supported in the frame, as shown in Fig. 1, such shaft carrying on its upper end a hand-wheel, $m$, by rotating which the finger-plate G may be turned into any desirable position as circumstances may require. $o$ is a hand-clutch lever, so affixed or pivoted to the inner side of the vertical bar $p$ of the frame as to enable the lower end thereof to be readily thrown into or out of engagement with the rack $k$, in order to enable the finger-plate to be moved and set in any desired position to cut either a straight swarth or one of any desirable curvature. H is a curved deflector or guard, disposed on the left side of the finger-plate, the same being to deflect the cut grass or prevent it from being carried around so as to clog the knives or the guide-wheel C. This guide-wheel is supported in a metallic frame, the ends of which are firmly secured to the finger-plate G, one end of the frame extending under the base of the main frame A, and serving to connect the plate G with the frame A, and maintain the parts in their proper relation and allow the plate G to be partially rotated. The supporting and guide wheel C is disposed within an opening formed within the plate G and the frame A, as shown in Fig. 3. This wheel, besides performing the functions of supporting and guiding the machine, serves to determine the height at which the grass is to be cut, and in practice is to be so hung as to be adjustable vertically, so as to enable the cutters to sever the grass at any desirable height. O is a hand-lever, by which the machine is propelled, the same being attached to the rear part of the frame, and is provided with two stays or chains to preserve the handle in an elevated position, as shown in Figs. 1 and 2.

I would remark that although this machine is designed for cutting lawns or small strips of ground, it may be constructed of such dimensions as to cut a swath of any desirable width, and be worked by horse-power properly connected therewith.

From the above it will be seen that my improved machine will not only cut a straight swath, like the ordinary lawn-mowers, but will also cut a swath of any desired curvature, such enabling the machine to operate with great effectiveness and facility on lawns around trees, shrubbery, or stones.

Having described my invention, what I claim is—

1. The improved lawn-mower, as described, the same consisting essentially of the frame A A, driving-wheels B B, supporting and guide wheel C, the rotary cutter-carrier and its series of knives, and the turning finger-plate G, constructed, arranged, and combined together substantially in manner as shown and described.

2. In a lawn-mower provided with a turning finger-plate, as described, the combination, with the latter, of the guide and supporting wheel C, substantially as described.

WILLIAM SELLERS.

Witnesses:
CHARLES J. NOYES,
LOUIS GIRARDIN.